United States Patent Office 2,740,818
Patented Apr. 3, 1956

2,740,818

PRODUCTION OF FINELY DIVIDED BENZENE HEXACHLORIDE

Bernard H. Nicolaisen, Kenmore, N. Y., assignor to Olin Mathieson Chemical Corporation, a corporation of Virginia No Drawing. Application December 23, 1952, Serial No. 327,679

10 Claims. (Cl. 260—648)

My invention relates to a process for the production of benzene hexachloride in finely divided form. More particularly, it relates to a process for producing benzene hexachloride in finely divided form by the steam distillation of oil-in-water type emulsions formed by emulsifying a solution of benzene hexachloride in a suitable solvent in water.

In the usual method of manufacturing benzene hexachloride, benzene is treated with a relatively small proportion of chlorine with illumination to cause the chlorine to react additively with the benzene. In order to avoid substitution chlorination and the formation of various by-products, the conventional technique is to convert only a small fraction of the benzene to benzene hexachloride before separating the benzene hexachloride and benzene. Usually distillation serves this purpose, and the overhead benzene is recycled to the reaction while the residual benzene hexachloride is freed from traces of benzene. In the customary procedure, the benzene hexachloride is obtained as a liquid residue which is solidified in the form of blocks or flakes. In order to produce finely divided benzene hexachloride, preferred for use as an insecticide, it is necessary to reduce the particle size of the product by grinding. The benzene hexachloride usually contains impurities which under the conditions of grinding make it sticky and difficult to reduce the finely divided form.

The process of my invention is particularly advantageous because I can utilize the reaction solution of benzene hexachloride in benzene directly from the benzene hexachloride reactor to produce a finely divided benzene hexachloride product without subjecting the reaction solution to intermediate separation as well as avoiding the grinding operation described above. My invention allows a much simplified recovery system for benzene hexachloride and permits direct production of a finished, saleable product.

My process for producing finely divided benzene hexachloride comprises emulsifying a solution of benzene hexachloride in a non-reactive, water-immiscible, steam-volatile solvent in water to form an oil-in-water type emulsion, steam distilling the emulsion to remove substantially all of the solvent, and recovering the finely divided benzene hexachloride product from the resulting dispersion of finely divided benzene hexachloride in water.

In practicing my process, a dilute solution of benzene hexachloride in any non-reactive, water-immiscible, steam-volatile solvent, but particularly in solution in benzene such as is obtained directly from the benzene hexachloride reactor, is emulsified in a sufficient amount of water so that the water forms the continuous phase of the emulsion by the use of a suitable emulsifying agent, and the emulsion is steam distilled to remove the solvent. After the steam distillation has removed substantially all of the solvent, the residue consists of a dispersion of finely divided benzene hexachloride particles in water. The benzene hexachloride particles are suitably removed by filtration or centrifuging, the emulsifying agent remaining largely in the water. It is advantageous to recycle the aqueous portion separated from the benzene hexachloride particles to the emulsifying step of the process for the dispersion of more benzene hexachloride solution. The benzene hexachloride product separated from the water dispersion is in a desirable finely divided form suitable for insecticidal use.

Effective emulsifying agents are those of the anionic types including the salts of fatty alcohol sulfates and of alkyl aryl sulfonates. The latter are particularly suitable. Specific examples include sodium lauryl sulfate, "Ultrawet K" (a commercial sodium alkyl benzene sulfonate), and sodium keryl benzene sulfonate (in which the keryl benzene is derived by chlorination of kerosene and condensation with benzene in the presence of aluminum chloride).

A sufficient amount of an effective emulsifying agent must be employed to emulsify the solution of benzene hexachloride in the water. The actual minimum amount of emulsifying agent which must be used in a particular case will depend on a number of variable factors including the particular emulsifying agent employed and the benzene hexachloride solvent employed. Generally, at least about 0.75 per cent by weight (based on the benzene hexachloride content of the solution charged) of an effective emulsifying agent is used to obtain a satisfactory emulsion. It is desirable, however, particularly when my process is utilized for the production of an extremely finely divided product suitable for dusting as an insecticide, that less than about 15 per cent by weight (based on the benzene hexachloride content of the solution charged) of the emulsifying agent be used. Lesser amounts down to about 0.75 per cent result in a larger proportion of extremely finely divided product suitable for dusting as an insecticide or for incorporation with other materials for the same purpose. I prefer to use from about 1.0 to 5.0 per cent by weight (based on the benzene hexachloride content of the solution charged) of the emulsifying agent for maximum fineness in the benzene hexachloride product.

While the amount of water employed in producing the emulsion of benzene hexachloride solution and water is not at all critical as long as a sufficient amount of water is used to form an oil-in-water type emulsion, i. e., one in which the water is the continuous phase, I have found it preferable from the standpoint of economies in steam distillation and product recovery to employ an amount of water in the range of about 100 to about 200 per cent by weight based on the benzene hexachloride solution charged.

While the process of my invention is described in terms of the production of finely divided benzene hexachloride from a solution of crude benzene hexachloride in benzene such as is obtained directly from a benzene hexachloride reactor, it is equally applicable to the production of a finely divided product from any liquid solution of either benzene hexachloride or any of the individual isomers of benzene hexachloride in a non-reactive, water-immiscible, steam-volatile solvent. Solvent useful in my process in addition to benzene include xylene, ethylene dichloride, chloroform, carbon tetrachloride, ethyl acetate and ethyl ether. My invention provides an advantageous process for the production of finely divided benzene hexachloride rich in the gamma isomer from gamma-rich extracts produced by extraction of crude benzene hexachloride with a selective solvent. Such products are preferred because of their increased gamma isomer concentration and, therefore, increased insecticidal activity.

The following examples are intended to be illustrative only.

*Example I*

A 19 per cent solution of benzene hexachloride in benzene was emulsified in 1.5 times its weight of water with the aid of 2.5 per cent by weight (based on the benzene hexachloride content of the solution) of "Ultrawet K" (a sodium alkyl benzene sulfonate). A small amount of a silicone antifoaming agent was also added. The emulsion was steamed vigorously until the distillate was benzene-free. It was then settled, decanted and the residual sludge was filtered. The air-dried powder was fine and free-flowing. It showed a screen analysis (Tyler Standard Sieve Series) as follows:

|  | Wt. percent |
|---|---|
| On 170 | 32.0 |
| Through 170, on 270 | 66.2 |
| Through 270, on 325 | 1.9 |

*Example II*

The procedure of Example I was repeated using the same materials except that 10.0 per cent by weight (based on the benzene hexachloride content of the solution) of the same emulsifying agent was used. The screen analysis (Tyler Standard Sieve Series) of the product was:

|  | Wt. percent |
|---|---|
| On 170 | 53.7 |
| Through 170, on 270 | 45.8 |
| Through 270, on 325 | 0.5 |

I claim:

1. A process for the production of finely divided benzene hexachloride which comprises emulsifying a solution of benzene hexachloride in a non-reactive, water-immiscible, steam-volatile solvent in water containing an emulsifying agent to form an oil-in-water type emulsion, steam distilling the emulsion to remove substantially all of the solvent, and recovering the finely divided benzene hexachloride product from the resulting dispersion of finely divided benzene hexachloride in water.

2. The process of claim 1 in which the solvent is benzene.

3. A process for the production of finely divided benzene hexachloride which comprises emulsifying a solution of benzene hexachloride in a non-reactive, water-immiscible, steam-volatile solvent in water to form an oil-in-water type emulsion with the aid of an effective emulsifying agent present in an amount less than about 15 per cent by weight based on the benzene hexachloride content of the solution charged, steam distilling the emulsion to remove substantially all of the solvent, and recovering the finely divided benzene hexachloride product from the resulting dispersion of finely divided benzene hexachloride in water.

4. The process of claim 3 in which the solvent is benzene.

5. A process for the production of finely divided benzene hexachloride which comprises emulsifying a solution of benzene hexachloride in a non-reactive, water-immiscible, steam-volatile solvent in water to form an oil-in-water type emulsion with the aid of an effective emulsifying agent present in an amount within the range of about 1.0 per cent to about 10 per cent by weight based on the benzene hexachloride content of the solution charged, steam distilling the emulsion to remove substantially all of the solvent, and recovering the finely divided benzene hexachloride product from the resulting dispersion of finely divided benzene hexachloride in water.

6. The process of claim 5 in which the solvent is benzene.

7. The process of claim 5 in which the solvent is benzene and the emulsifying agent is a sodium alkyl benzene sulfonate.

8. A process for the production of finely divided benzene hexachloride which comprises emulsifying a solution of benzene hexachloride in a non-reactive, water-immiscible, steam-volatile solvent in water to form an oil-in-water type emulsion with the aid of an effective emulsifying agent present in an amount within the range of about 1.0 per cent to about 10 per cent by weight based on the benzene hexachloride content of the solution charged, steam distilling the emulsion to remove substantially all of the solvent, recovering the finely divided benzene hexachloride product from the resulting dispersion of finely divided benzene hexachloride in water, and recycling to the emulsifying step the water separated from the finely divided benzene hexachloride product.

9. The process of claim 8 in which the solvent is benzene.

10. The process of claim 8 in which the solvent is benzene and the emulsifying agent is a sodium alkyl benzene sulfonate.

References Cited in the file of this patent

UNITED STATES PATENTS

| 2,585,967 | Schibler | Feb. 19, 1952 |

FOREIGN PATENTS

| 592,670 | Great Britain | Sept. 25, 1947 |
| 649,428 | Great Britain | June 24, 1951 |
| 680,517 | Great Britain | Oct. 8, 1952 |